US010884751B2

(12) United States Patent
Kalamatianos et al.

(10) Patent No.: US 10,884,751 B2
(45) Date of Patent: Jan. 5, 2021

(54) METHOD AND APPARATUS FOR VIRTUALIZING THE MICRO-OP CACHE

(71) Applicant: Advanced Micro Devices, Inc., Santa Clara, CA (US)

(72) Inventors: John Kalamatianos, Arlington, MA (US); Jagadish B. Kotra, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 31 days.

(21) Appl. No.: 16/034,844

(22) Filed: Jul. 13, 2018

(65) Prior Publication Data

US 2020/0019406 A1    Jan. 16, 2020

(51) Int. Cl.
| | | |
|---|---|---|
| *G06F 9/38* | (2018.01) | |
| *G06F 9/30* | (2018.01) | |
| *G06F 12/0875* | (2016.01) | |
| *G06F 12/0897* | (2016.01) | |

(52) U.S. Cl.
CPC ........ *G06F 9/3824* (2013.01); *G06F 9/30145* (2013.01); *G06F 12/0875* (2013.01); *G06F 12/0897* (2013.01)

(58) Field of Classification Search
None
See application file for complete search history.

(56) References Cited

U.S. PATENT DOCUMENTS

| | | | |
|---|---|---|---|
| 4,901,235 A | 2/1990 | Vora et al. | |
| 5,132,927 A | 7/1992 | Lenoski et al. | |
| 5,278,973 A | 1/1994 | O'brien et al. | |
| 5,649,112 A | 7/1997 | Yeager et al. | |

(Continued)

FOREIGN PATENT DOCUMENTS

WO    97/13194 A1    4/1997

OTHER PUBLICATIONS

International Search Report and Written Opinion in International Application No. PCT/US2008/006746, dated Oct. 1, 2008, 12 pages.

(Continued)

*Primary Examiner* — Steven G Snyder
(74) *Attorney, Agent, or Firm* — Kowert Hood Munyon Rankin and Goetzel PC; Rory D. Rankin

(57) ABSTRACT

Systems, apparatuses, and methods for virtualizing a micro-operation cache are disclosed. A processor includes at least a micro-operation cache, a conventional cache subsystem, a decode unit, and control logic. The decode unit decodes instructions into micro-operations which are then stored in the micro-operation cache. The micro-operation cache has limited capacity for storing micro-operations. When new micro-operations are decoded from pending instructions, existing micro-operations are evicted from the micro-operation cache to make room for the new micro-operations. Rather than being discarded, micro-operations evicted from the micro-operation cache are stored in the conventional cache subsystem. This prevents the original instruction from having to be decoded again on subsequent executions. When the control logic determines that micro-operations for one or more fetched instructions are stored in either the micro-operation cache or the conventional cache subsystem, the control logic causes the decode unit to transition to a reduced-power state.

20 Claims, 10 Drawing Sheets

(56) References Cited

U.S. PATENT DOCUMENTS

| | | |
|---|---|---|
| 5,671,356 A | 9/1997 | Wang |
| 5,796,972 A | 8/1998 | Johnson et al. |
| 5,826,052 A | 10/1998 | Stiles et al. |
| 5,864,689 A | 1/1999 | Tran |
| 5,889,978 A | 3/1999 | Jayakumar |
| 5,950,012 A | 9/1999 | Shiell et al. |
| 6,038,645 A * | 3/2000 | Nanda ................. G06F 12/0804 711/133 |
| 6,125,412 A | 9/2000 | Picard et al. |
| 6,141,740 A | 10/2000 | Mahalingaiah et al. |
| 6,397,301 B1 | 5/2002 | Quach et al. |
| 6,643,800 B1 | 11/2003 | Safford et al. |
| 6,745,306 B1 | 6/2004 | Willman et al. |
| 6,754,765 B1 | 6/2004 | Chang et al. |
| 7,095,342 B1 | 8/2006 | Hum et al. |
| 7,370,243 B1 | 5/2008 | Grohoski et al. |
| 7,734,873 B2 | 6/2010 | Lauterbach et al. |
| 7,783,871 B2 * | 8/2010 | Combs ................. G06F 9/3844 712/239 |
| 7,937,574 B2 | 5/2011 | Clark et al. |
| 8,127,085 B2 * | 2/2012 | Rappoport .......... G06F 12/0806 711/145 |
| 8,706,979 B2 * | 4/2014 | Gabor ................. G06F 12/0888 711/156 |
| 8,880,851 B2 * | 11/2014 | Henry .................... G06F 9/265 712/200 |
| 9,934,037 B2 * | 4/2018 | Holm .................. G06F 9/30145 |
| 10,191,746 B2 * | 1/2019 | Abdallah .............. G06F 9/3808 |
| 10,521,239 B2 * | 12/2019 | Abdallah .............. G06F 9/3887 |
| 2001/0052066 A1 | 12/2001 | Lee et al. |
| 2002/0069328 A1 | 6/2002 | Chauvel |
| 2004/0268102 A1 * | 12/2004 | Combs ................. G06F 9/3806 712/240 |
| 2005/0055510 A1 | 3/2005 | Hass et al. |
| 2005/0188156 A1 | 8/2005 | Mukker et al. |
| 2006/0015707 A1 * | 1/2006 | Brown ...................... G06F 9/26 712/242 |
| 2006/0174079 A1 | 8/2006 | Kajihara |
| 2008/0256336 A1 | 10/2008 | Henry et al. |
| 2008/0263339 A1 | 10/2008 | Kriegel et al. |
| 2009/0172314 A1 * | 7/2009 | Gabor ................. G06F 12/0888 711/156 |
| 2010/0138608 A1 * | 6/2010 | Rappoport .......... G06F 12/0806 711/123 |
| 2011/0296096 A1 * | 12/2011 | Zou ..................... G06F 9/30174 711/105 |
| 2012/0260067 A1 * | 10/2012 | Henry ................. G06F 9/30076 712/200 |
| 2014/0344554 A1 * | 11/2014 | Abdallah ................ G06F 9/384 712/217 |
| 2015/0039859 A1 * | 2/2015 | Abdallah .............. G06F 9/3838 712/206 |
| 2015/0100763 A1 * | 4/2015 | Holm .................. G06F 9/30145 712/210 |
| 2015/0186144 A1 * | 7/2015 | Abdallah .............. G06F 9/3808 712/206 |
| 2016/0026486 A1 * | 1/2016 | Abdallah .............. G06F 9/4552 703/26 |
| 2017/0024219 A1 * | 1/2017 | Abdallah ........... G06F 9/30145 |
| 2019/0391813 A1 * | 12/2019 | Evers ................... G06F 9/3818 |
| 2020/0089498 A1 * | 3/2020 | Annamalai .......... G06F 1/3287 |
| 2020/0210190 A1 * | 7/2020 | Hensley ................ G06F 9/3804 |
| 2020/0210196 A1 * | 7/2020 | Ghetie .................. G06F 1/3234 |

OTHER PUBLICATIONS

Jacob et al., "A Look at Several Memory Management Units, TLB-Refill Mechanisms, and Page Table Organizations" Proceedings of the Eighth International Conference on Architectural Support for Programming Languages and Operating Systems, Oct. 1, 1998, pp. 295-306.

Troester et al., U.S. Appl. No. 15/986,626, entitled "Fastpath Microcode Sequencer", filed May 22, 2018, 28 pages.

* cited by examiner

METHOD AND APPARATUS FOR VIRTUALIZING THE MICRO-OP CACHE

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

When executing an instruction stream, central processing unit (CPU) cores fetch instructions and decode the instructions into micro-operations (or micro-operations for short). The micro-operations are then supplied to the CPU back-end for execution. Modern CPU cores use a micro-operation cache to reduce the number of times instructions have to be decoded. Reducing the number of times instructions have to be decoded helps to decrease power consumption. The benefits of this approach depend on the instruction working set size and the size of the micro-operation cache. When newly decoded micro-operations need to be stored and the micro-operation cache is full, one or more micro-operation cache entries are evicted and the micro-operations from these entries are discarded. Subsequent requests for the same addresses fetch instructions to be decoded again into micro-operations. One solution to reduce usage of the decode unit is to increase the size of the micro-operation cache so that the hit rate is higher. However, increasing the micro-operation cache might not be a viable solution if it disrupts the floorplan of the CPU core.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
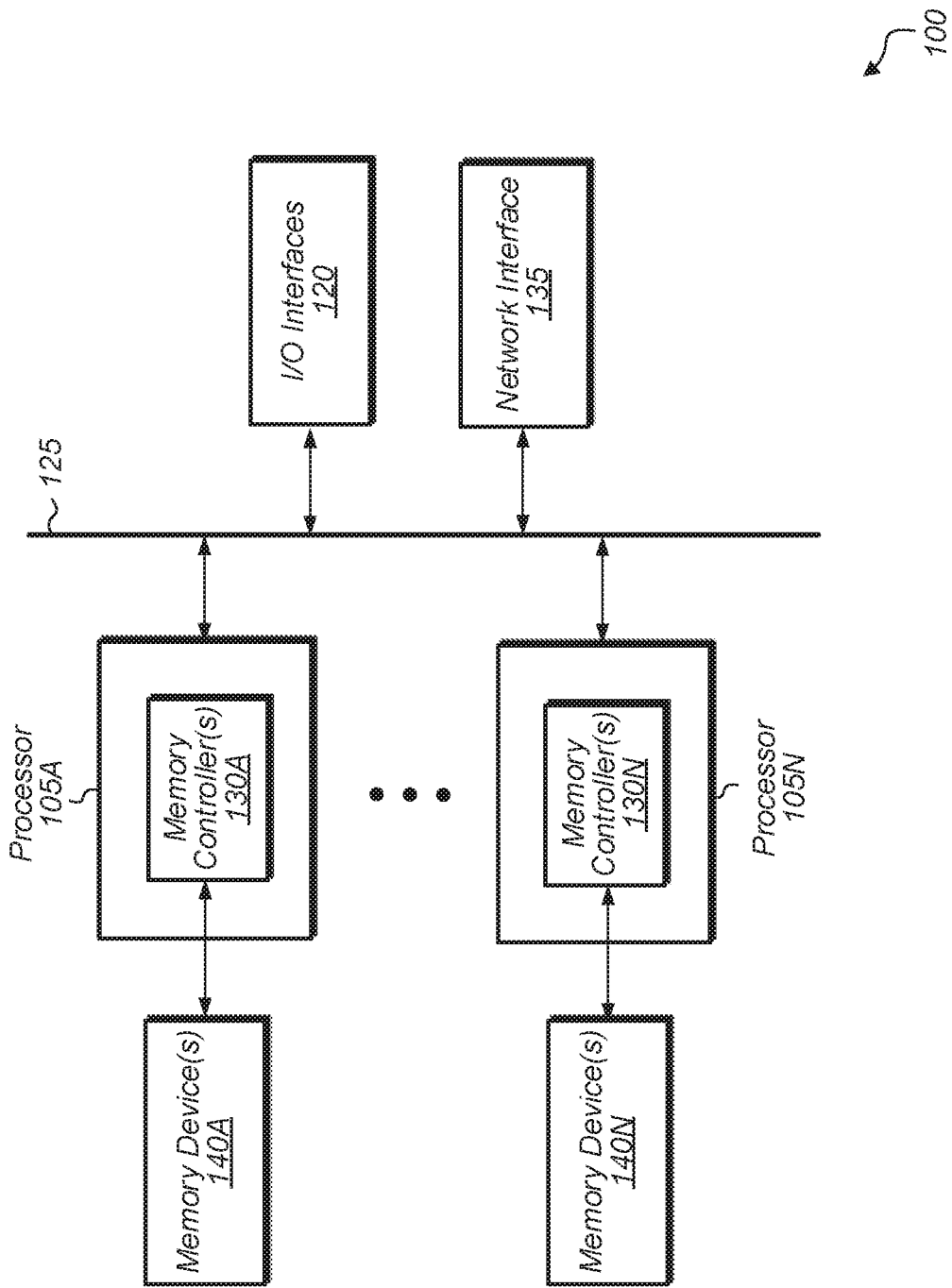
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for virtualizing a micro-operation cache are disclosed herein. A system includes at least one or more processors coupled to one or more memory devices. The one or more processors include a processor pipeline with various pipeline stages. These stages include at least a fetch unit and a decode unit. The processor pipeline also includes a conventional cache subsystem, a micro-operation cache, and a control unit with logic for managing micro-operations. The micro-operation cache stores micro-operations that have already been decoded by the decode unit for instructions retrieved by the fetch unit. In one implementation, the conventional cache subsystem includes a level one (L1) cache for storing instructions.

In one implementation, the size of the micro-operation cache is limited to storing a subset of the working set of micro-operations. Accordingly, when the micro-operation cache is fully occupied, storing newly decoded micro-operations in the micro-operation cache will result in the eviction of previously decoded micro-operations. Rather than dropping the evicted micro-operations, the evicted micro-operations are written to the conventional cache subsystem. Subsequent executions of the corresponding instructions will then cause the micro-operations to be retrieved from the conventional cache subsystem rather than refetching the instructions and decoding them into micro-operations again. By implementing these and other techniques, the energy efficiency of the processors is improved by reducing the use of the decode unit.

In one implementation, the processor pipeline includes a pre-decode cache for storing metadata corresponding to entries in the conventional cache subsystem which store micro-operations. When a given set of micro-operations are evicted from the micro-operation cache to the conventional cache subsystem, an entry is allocated in the pre-decode cache for the given set of micro-operations. In one implementation, the entry includes a start offset and an end offset to indicate which instruction(s) the given set of micro-operations are decoded from.

In one implementation, when a fetch address is obtained for an instruction in an instruction stream being fetched, the fetch unit performs simultaneous lookups of the instruction cache and the pre-decode cache. If the lookup to the pre-decode cache is a hit, then a set of micro-operations are retrieved from a corresponding entry in the instruction cache. In some cases, two or more entries are retrieved from the instruction cache and micro-operations are retrieved from these entries. If the lookup to the pre-decode cache is a miss, then it is assumed that a matching entry in the instruction cache contains instructions rather than micro-operations. Given that the present discussion describes implementations using a fetch address to lookup the caches, some implementations are contemplated that use a physical address as a fetch address and some implementations are contemplated that use a virtual index and a physical tag as a fetch address.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components (e.g., display controller) and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, there can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
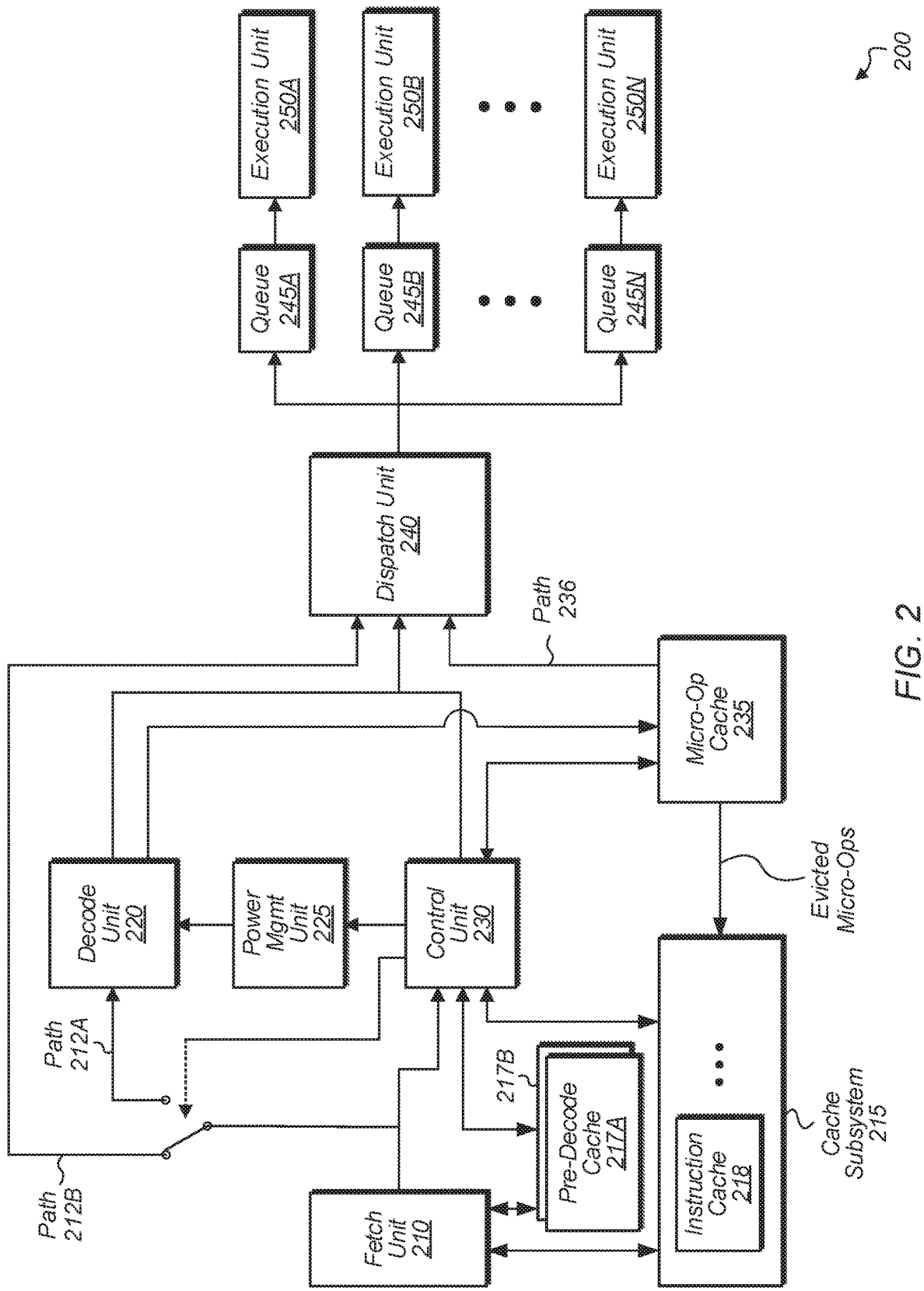
FIG. 2 is a block diagram of one implementation of a processor pipeline.

Turning now to FIG. 2, a block diagram of one implementation of a processor pipeline 200 is shown. In various implementations, processors 105A-N (of FIG. 1) include one or more instantiations of processor pipeline 200. In one implementation, processor pipeline 200 includes at least fetch unit 210, cache subsystem 215, pre-decode cache 217, decode unit 220, power management (mgmt) unit 225, control unit 230, micro-operation cache 235 ("micro-op cache 235" in FIG. 2), dispatch unit 240, queues 245A-N, and execution units 250A-N. It is noted that control unit 230 is also referred to herein as control logic. It is also noted that cache subsystem 215 is also referred to herein as a conventional cache subsystem. It should be understood that processor pipeline 200 also includes other components (e.g., branch prediction unit) which are not shown to avoid obscuring the figure. In other implementations, processor pipeline 200 is structured in other suitable manners.

In one implementation, fetch unit 210 fetches instructions of a program stream from memory and/or an instruction cache 218 within cache subsystem 215. While cache subsystem 215 is shown as including instruction cache 218, it is noted that cache subsystem 215 also includes a level two (L2) cache, a level three (L3) cache, and potentially other caches in various implementations. In one implementation, fetch unit 210 performs parallel lookups to pre-decode cache 217 and cache subsystem 215 for the fetch address of a given instruction in the program stream. If there is an entry in pre-decode cache 217 for a given instruction, then the corresponding entry in cache subsystem 215 stores micro-operations. Otherwise, if there is not an entry in pre-decode cache 217 for a given instruction, then it is assumed that the corresponding line in cache subsystem 215 stores instructions. In some embodiments, the system may perform parallel lookups of the instruction cache 218 and the micro-operation cache 235. If there is a hit on the micro-operation cache 235, then the micro-operations are used via path 236. Alternatively, if there is a hit on the instruction cache 218, a determination is made as to whether the instruction cache 218 stores the instructions or micro-operations corresponding to the fetch address. In some embodiments, metadata stored in a pre-decode cache 217 or other structure indicates that the instruction cache 218 is currently storing micro-operations. If the instruction cache 218 stores micro-operations, then the micro-operations are used and decode unit 220 is bypassed using path 212B. If, on the other hand, the instruction cache 218 stores the instruction, then a decode of the instruction is performed using path 212A.

Based on the results of the parallel lookups, control unit 230 determines whether to convey instructions on path 212A to decode unit 220 or convey micro-operations on path 212B bypassing decode unit 220 or convey micro-operations on path 236 from micro-operation cache 235. In one implementation, control unit 230 controls activation of path 212B which bypasses decode unit 220. In one implementation, fetch unit 210 conveys instructions on path 212A to decode unit 220 when the micro-operations of the instructions are not available in either cache subsystem 215 or micro-operation cache 235. In this implementation, fetch unit 210 conveys micro-operations on path 212B if the micro-operations of the instructions are available in the cache subsystem 215 but not in the micro-operation cache 235. In this implementation, micro-operation cache 235 conveys micro-operations on path 236 if the micro-operations of the instructions are available in the micro-operation cache 235. In one implementation, control unit 230 provides an indication to fetch unit 210 of whether the micro-operations of the instructions are available in either cache subsystem 215 or micro-operation cache 235. In a further implementation, control unit 230 is integrated within fetch unit 210. Other implementations with other types of structures and/or arrangements of units are possible and are contemplated.

In one implementation, if the micro-operations are not available in either cache subsystem 215 or micro-operation cache 235, then fetch unit 210 conveys the fetched instructions on path 212A to decode unit 220. Decode unit 220 decodes the fetched instructions into instruction operations (or ops for short). Generally, a micro-operation is an operation that the hardware included in execution units 230A-N is capable of executing. In various implementations, each instruction translates to one or more micro-operations which, when executed, result in the performance of the operations defined for that instruction according to the instruction set architecture. Any type of instruction set architecture (e.g., x86) is employed by processor pipeline 200. Decode unit 220 identifies the type of instructions, source operands, etc., and each decoded micro-operation includes the instruction along with some of the decode information. In implementations in which each instruction translates to a single micro-op, each micro-operation is the corresponding instruction or a portion thereof (e.g., the opcode field or fields of the instruction). In some implementations, decode unit 220 includes any combination of circuitry and/or microcode for generating micro-operations for instructions. For example, in one implementation, relatively simple micro-operation generations (e.g., one or two micro-operations per instruction) are handled in hardware while more extensive micro-operation generations (e.g., more than three micro-operations for an instruction) are handled in microcode.

After decode unit 220 decodes an instruction into one or more micro-operations, the micro-operations are conveyed to micro-operation cache 235. Micro-operation cache 235 includes any type and capacity of cache structure for storing micro-operations from recently decoded instructions. Typically, micro-operation cache 235 only has a storage capacity to store a portion of the micro-operations for decoded instructions being executed by processor pipeline 200. Accordingly, when micro-operation cache 235 receives micro-operations of newly decoded instructions, micro-operation cache 235 will typically have to evict one or more cache lines to make room for the new micro-operations. Rather than discarding the micro-operations of these evicted cache lines, the evicted micro-operations are sent to cache subsystem 215. It is noted that cache subsystem 215 is also referred to as a "conventional cache subsystem" to differentiate cache subsystem 215 from micro-operation cache 235. Cache subsystem 215 includes any number and type of cache levels for storing instructions and/or data. For example, in one implementation, cache subsystem 215 includes a level one (L1) cache and a level two (L2) cache. In other implementations, cache subsystem 215 includes other levels and/or organizations of caches. In one implementation, control unit 230 queries pre-decode caches 217A-B to determine whether micro-operations for a given instruction are stored in cache subsystem 215. When micro-operations are evicted from micro-operation cache 235 to cache subsystem 215, an entry is allocated in one of pre-decode caches 217A-B to indicate that the micro-operations are now stored in cache subsystem 215. In one implementation, there is a separate pre-decode cache 217A-B for each level of cache subsystem 215. In another implementation, there is a single, shared pre-decode cache 217A across all levels of cache subsystem 215.

If the micro-operations of the given instruction are stored in micro-operation cache 235, then control unit 230 retrieves these micro-operations from micro-operation cache 235 via path 236. If the micro-operations of the given instruction are stored in cache subsystem 215, then control unit 230 retrieves these micro-operations from cache subsystem 215. In either case, control unit 230 is able to cause decode unit 220 to transition into a reduced power state by sending the appropriate control signals to power management unit 225. As used herein, a "reduced power state" is defined as a power state in which decode unit 220 consumes less power than the peak power consumption of decode unit 220 when decode unit 220 is decoding fetched instructions. In one implementation, a "reduced power state" refers to a power-gated state when decode unit 220 is turned off. In another implementation, a "reduced power state" refers to a state when decode unit 220 is supplied with a lower than maximum voltage and/or with a lower than maximum clock frequency. In a further implementation, decode unit 220 is clock-gated in the "reduced power state". It is noted that a "reduced power state" is also referred to as a "low power state". By transitioning decode unit 220 into a reduced power state, the power consumed by processor pipeline 200 decreases.

The micro-operations from decode unit 220 or control unit 230 are provided to dispatch unit 240, and dispatch unit 240 assigns the micro-operations to queues 245A-N. As shown in processor pipeline 200, each queue 245A-N is coupled to a corresponding execution unit 250A-N. However, in other implementations, one or more queues 225A-N are coupled to multiple execution units 250A-N. When the dependencies are resolved and the ops are ready to execute, pickers (not shown) will pick the ops out of queues 245A-N to execute on the execution units 250A-N.

Figure 3:
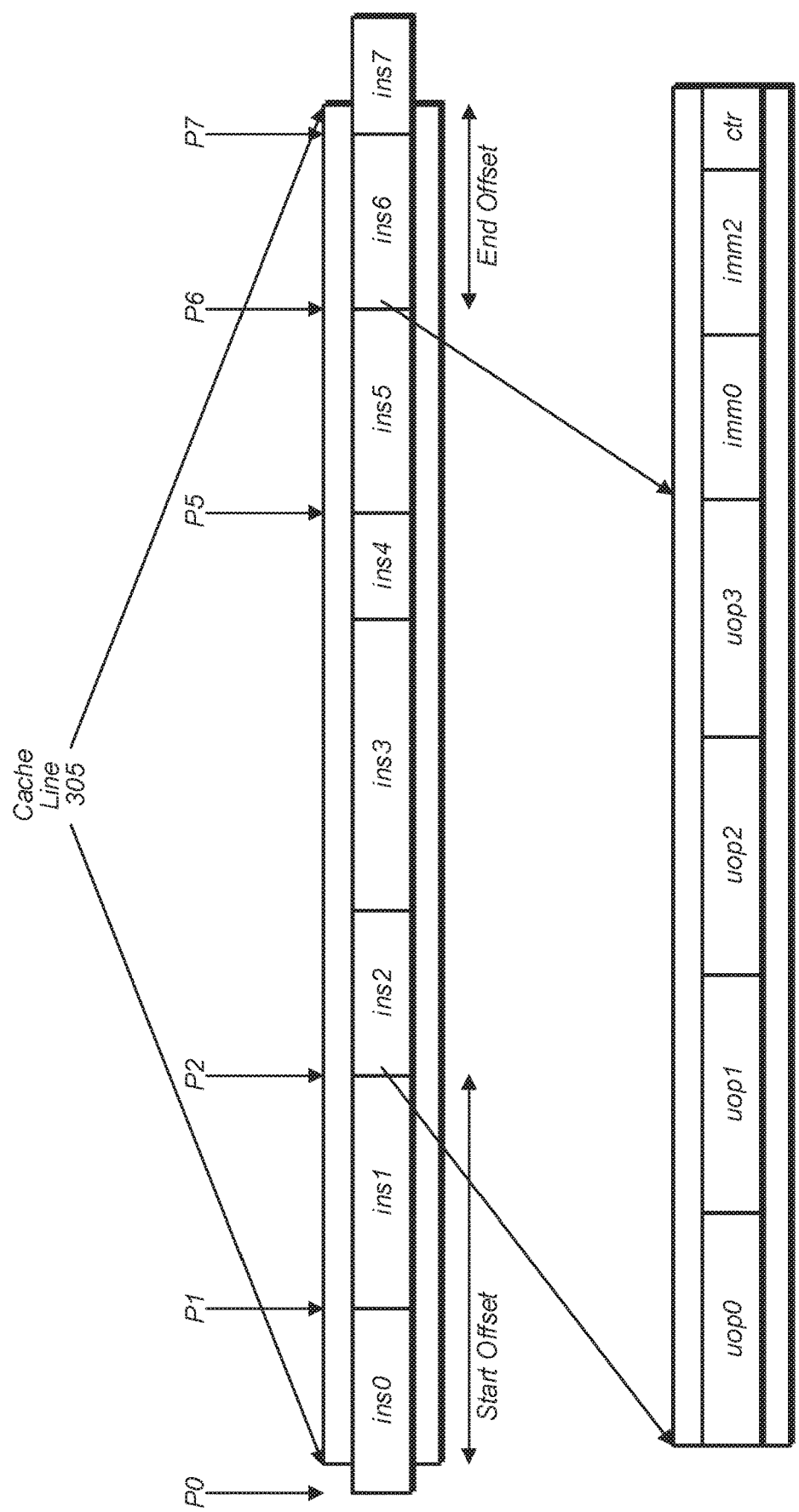
FIG. 3 is a block diagram of one implementation of a cache line for storing instructions.

Referring now to FIG. 3, a block diagram of one implementation of a cache line 305 for storing instructions is shown. Cache line 305 at the top of diagram 300 illustrates an example of how a group of instructions (ins0-7) are stored in a cache line of a cache subsystem (e.g., cache subsystem 215 of FIG. 2). The boundaries between instruction ins0-7 are shown as pointers (P) P0-P7. The bottom of diagram 300 illustrates examples of micro-operations (abbreviated as "uop" in FIG. 3) which are decoded from instructions ins2-5. In this example, it is assumed that there is a one-to-one mapping between instructions ins2-5 and micro-operations 0-3 (i.e., uop0-uop3), respectively, although this does not have to be the case. In other implementations, each instruction maps to multiple micro-operations.

In one implementation, addressing the micro-operation cache requires knowing the exact byte-level start and end address that the micro-operations map to inside the original code segment. In one implementation, every micro-operation cache entry stores two offsets in its tags. The first offset points to the start byte of the first instruction mapped by the micro-operations in the micro-operation cache entry. The second offset points to the start byte of the next sequential instruction after the instruction corresponding to the last micro-operation in the micro-operation cache entry. This information is not required when accessing x86 instructions in conventional caches. The offsets, shown as "Start offset" and "End offset" under cache line 305, are needed to correctly identify the instructions whose micro-operations are found in the micro-operation cache entry tagged with the cache-line normalized virtual or physical address.

The bottom of diagram 305 illustrates one example of how micro-operations 0-3 corresponding to instructions ins2-5 are stored in a cache line of a cache subsystem after being evicted from a micro-operation cache. In this example, it is assumed that micro-operation 0 and micro-operation 2 each have immediate ("imm") fields imm0 and imm2, respectively, which are also stored in the cache line. Also, a counter value ("ctr") is stored in the cache line with the micro-operations and immediate fields. In one implementation, the counter value indicates how many micro-operations are stored in the cache line. It should be understood that in other implementations, micro-operations 0-3 are arranged in different ways for being stored in a cache line of a cache subsystem.

Figure 4:
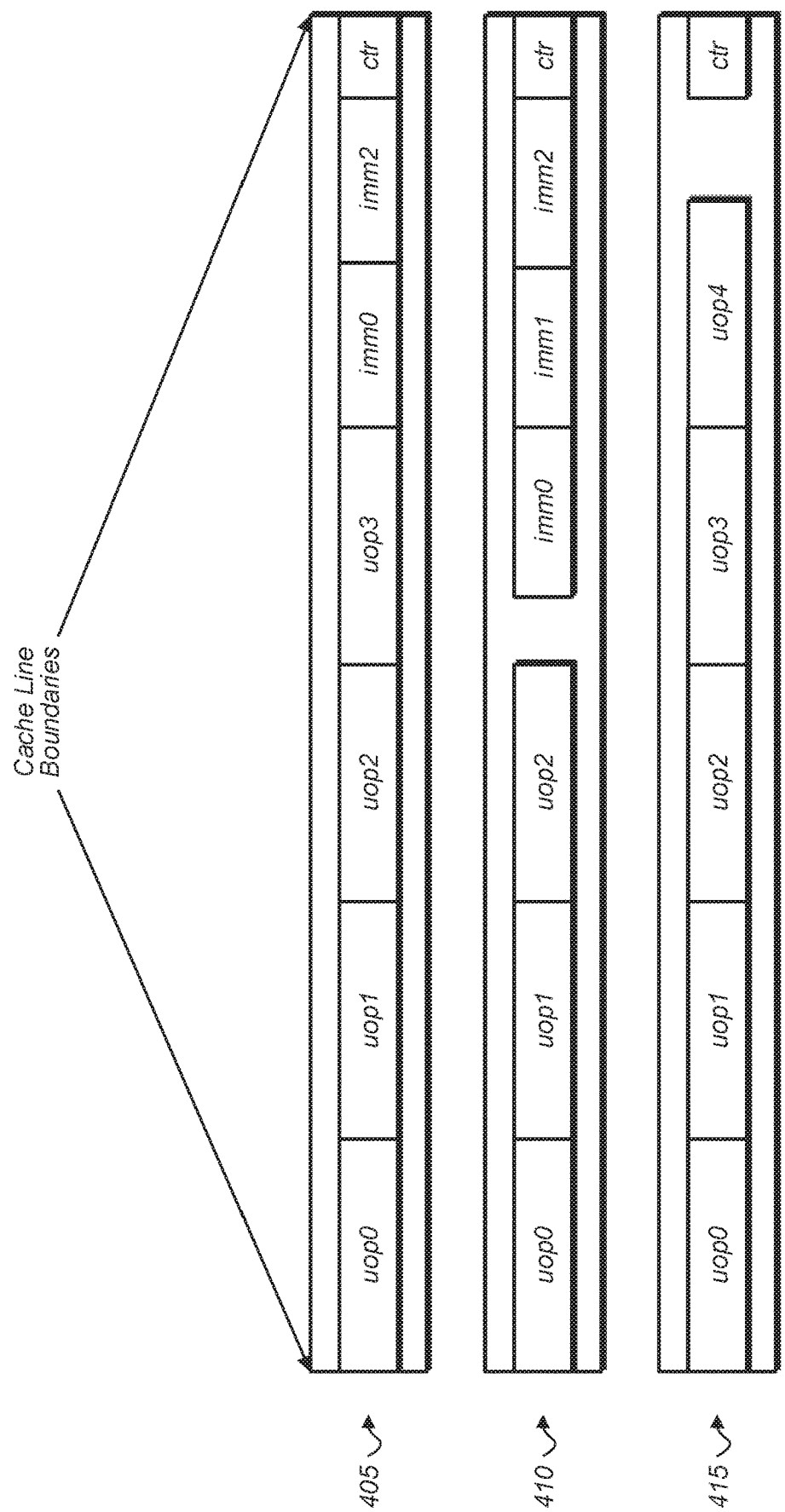
FIG. 4 is a block diagram of examples of different implementations of storing micro-operations in a conventional cache line.

Turning now to FIG. 4, examples of different implementations of storing micro-operations in a conventional cache line are shown. In one implementation, a micro-operation cache stores micro-operations and their associated immediate/displacement fields in a flexible format. In various implementations, a variety of micro-operation combinations, in terms of number of micro-operations and immediate/displacement fields, are generated for storing evicted micro-operations in cache lines in conventional caches. In one implementation, groups of micro-operations are stored in the same conventional cache line as their original, undecoded instructions. In other words, when a given group of micro-operations is evicted from the micro-operation cache, the given group of micro-operations overwrites the original, undecoded instructions in the corresponding cache line in the conventional cache.

In one implementation, for each conventional cache entry storing micro-operations, the entry consists of micro-operations, a number of immediate/displacement fields, and metadata indicating how many micro-operations and immediate or displacement fields are included per micro-operation cache entry and which micro-operations have immediate and/or displacement fields. In some cases, there is a maximum number of micro-operations that are supported for a given conventional cache entry. The maximum number of micro-operations that are supported in a conventional cache entry varies from implementation to implementation. In some cases, for a given cache line of conventional instructions, the corresponding micro-operations might not fit within the conventional cache line boundaries. In other words, the micro-operations which correspond to a cache line of instructions might exceed the size of a conventional cache line entry.

Conventional cache entry 405 illustrates one example of a cache entry that is utilized in one implementation. Conventional cache entry 405 stores 4 micro-operations (uop0-uop4), two of which have an immediate ("imm") field (i.e., imm0 corresponding to uop0 and imm corresponding to uop2). Conventional cache entry 410 illustrates another example of a cache entry that is utilized in one implementation. Conventional cache entry 410 stores 3 micro-operations, each of which has an immediate field. Conventional cache entry 415 illustrates a further example of a cache entry that is used in one implementation. Conventional cache entry 415 stores 5 micro-operations, none of which has an immediate or displacement field. For entries 405, 410, and 415, the "ctr" field includes metadata such as the number of valid micro-operations per entry. It is noted that there could be empty micro-operation slots in the micro-operation cache entry owing to the constraints imposed by the instruction cache to micro-operation cache mapping. There are other combinations that conventional caches are able to support which are not shown in FIG. 4.

In one implementation, control logic attempts to store the contents of each micro-operation cache entry from the micro-operation cache into a single conventional cache line if possible. Since the actual number of bits occupied by micro-operations and corresponding metadata inside a micro-operation cache entry varies, there could be empty space inside a micro-operation cache entry. In some cases, repositioning the metadata eliminates this empty space and the valid contents of the micro-operation cache entry are able to fit into a conventional cache line. For example, if there are no immediate or displacement fields for any of the micro-operations then the micro-operation cache entry contents might fit unchanged in a conventional cache line. If there are immediate and displacement fields and the size of the micro-operation cache entry exceeds the size of the conventional cache line, then the size of the micro-operation cache entry is reduced by compressing the immediate and displacement fields. In one implementation, if compression is successful in reducing the size of the micro-operation cache entry below or equal to the size of the conventional cache line, the contents of the micro-operation cache entry are evicted to the conventional cache. Alternatively, if compression is not able to reduce the size of the micro-operation cache entry below the size of the conventional cache line, then the evicted micro-operation cache entry occupies two ways in a conventional cache set. The corresponding pre-decode cache entry will record this with an indicator. In a further implementation, if the evicted micro-operation cache entry is larger than the size of the conventional cache line, the micro-operations are evicted and discarded rather than being sent to the conventional cache. In one implementation, in order to track if a micro-operation cache entry fits in a conventional cache line, one bit is added to each micro-operation cache entry. In one implementation, the value of this bit is calculated as a micro-operation cache entry is populated with new micro-operations. For the purposes of this calculation, micro-operation cache specific metadata (e.g., error protection bits, reserved bits) is ignored.

Figure 5:
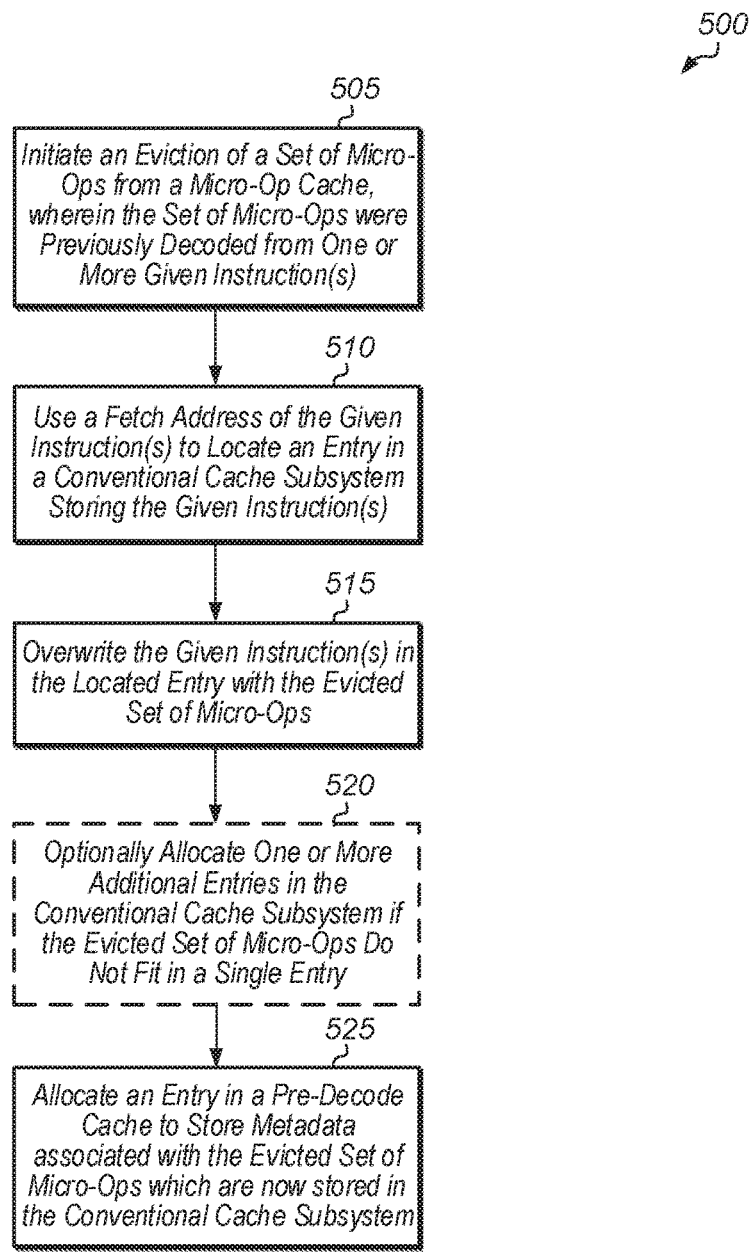
FIG. 5 is a generalized flow diagram illustrating one implementation of a method for virtualizing a micro-operation cache.

Turning now to FIG. 5, one implementation of a method 500 for virtualizing a micro-operation cache is shown. For purposes of discussion, the steps in this implementation and those of FIGS. 6-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

Control logic initiates an eviction of a set of micro-operations (referred to as "micro-ops" in the figure) from a micro-operation cache, wherein the set of micro-operations were previously decoded from one or more given instructions (block 505). Next, the control logic uses a fetch address of the given instruction(s) to locate an entry in a conventional cache subsystem storing the given instruction (block 510). In one implementation, the given instruction(s) are stored in an entry in an instruction cache. Then, the control logic overwrites the given instruction(s) in the located entry with the evicted set of micro-op(s) (block 515). Also, the control logic optionally stores one or more additional entries in the conventional cache subsystem if the evicted set of micro-op(s) do not fit in a single entry (block 520). Next, the control logic allocates an entry in a pre-decode cache to store metadata associated with the evicted set of micro-operations which are now stored in the conventional cache subsystem (block 525). In one implementation, the entry in the pre-decode cache includes start and end offsets for the locations of the given instruction(s). After block 525, method 500 ends.

Figure 6:
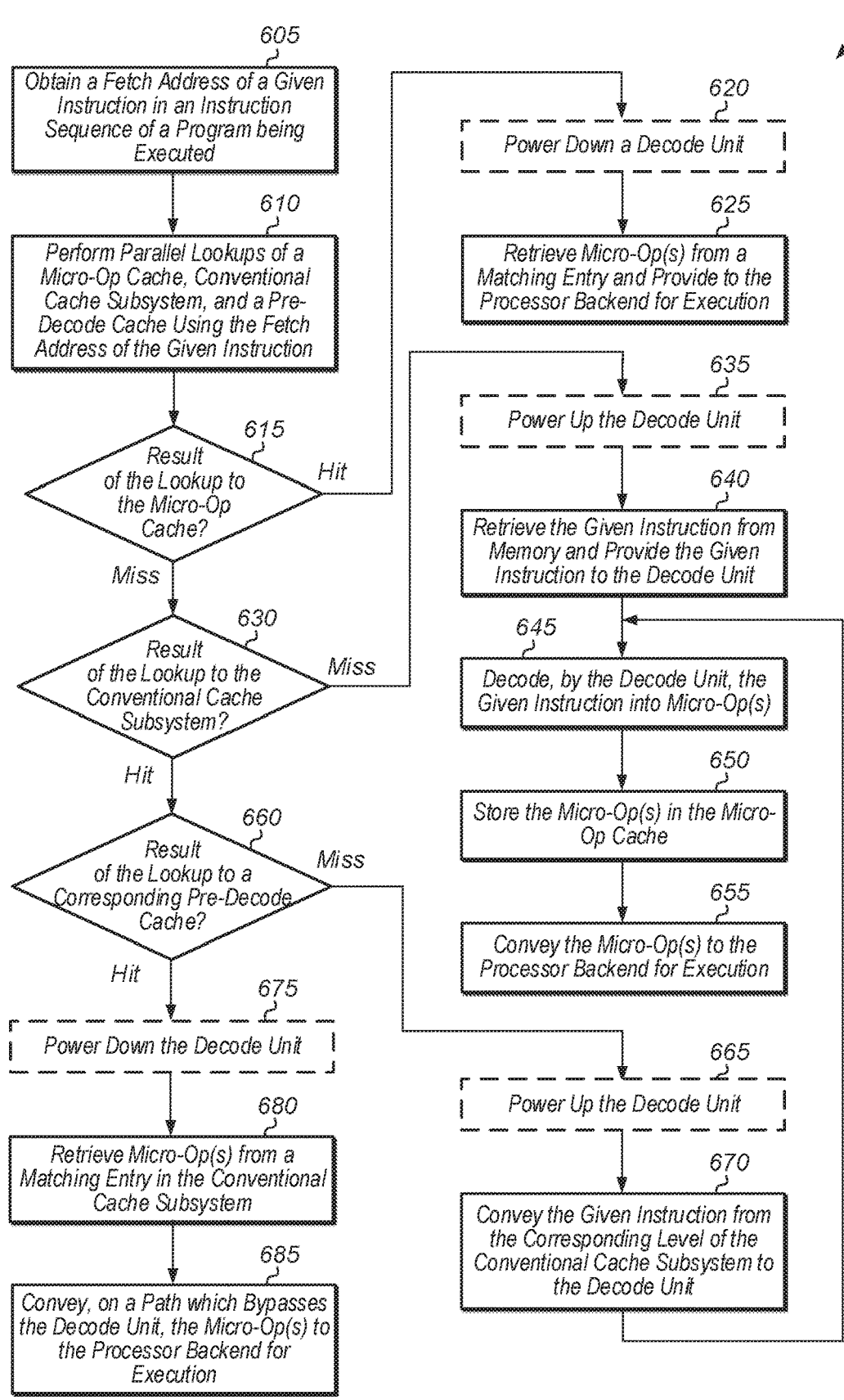
FIG. 6 is a generalized flow diagram illustrating one implementation of a method for processing instructions of an instruction sequence in a processor pipeline.

Referring now to FIG. 6, one implementation of a method 600 for processing instructions of an instruction sequence in a processor pipeline is shown. A fetch unit obtains a fetch address of a given instruction in an instruction sequence of a program being executed (block 605). Next, control logic performs parallel lookups of a micro-operation cache, conventional cache subsystem, and a pre-decode cache using the fetch address of the given instruction (block 610).

If the lookup of the micro-operation cache results in a hit (conditional block 615, "hit" leg), then control logic optionally powers down a decode unit (block 620). It is noted that in one implementation, "powering down" the decode unit involves causing the decode unit to transition to a reduced power state. If the decode unit is already powered down, then the decode unit remains in the powered down state in block 620. Also, control logic retrieves micro-op(s) from a matching entry of the micro-operation cache and provides the micro-op(s) to the processor backend (e.g., dispatch unit) for execution (block 625). After block 625, method 600 ends.

If the lookup of the micro-operation cache results in a miss (conditional block 615, "miss" leg), then the result of the lookup to the conventional cache subsystem is determined (conditional block 630). If the lookup of the conventional cache subsystem misses (conditional block 630, "miss" leg), then control logic optionally powers up the decode unit (if the decode unit is powered down) (block 635) and the given instruction is retrieved from memory (e.g., DRAM) and provided to the decode unit (block 640). The decode unit decodes the given instruction into micro-op(s) (block 645). The micro-op(s) are stored in the micro-operation cache (block 650), and then the micro-op(s) are conveyed to the processor backend for execution (block 655). After block 655, method 600 ends.

If the lookup of the conventional cache subsystem is a hit (conditional block 630, "hit" leg), then the result of the lookup to a corresponding pre-decode cache is determined (conditional block 660). For example, if the lookup of the conventional cache subsystem hits in a level one (L1) cache, then the L1 pre-decode cache is queried. If the lookup of the conventional cache subsystem hits in a L2 cache, then the L2 pre-decode cache is queried, and so on. In another implementation, there is a single, shared pre-decode cache for all levels of the conventional cache subsystem, in which case the shared pre-decode cache is queried in conditional block 660. If the lookup of the corresponding pre-decode cache is a miss (conditional block 660, "miss" leg), then control logic optionally powers up the decode unit (if the decode unit is off) (block 665) and then the given instructions are conveyed from the corresponding level of the conventional cache subsystem to the decode unit (block 670). Next, method 600 jumps to block 645. If the lookup of the corresponding pre-decode cache is a hit (conditional block 660, "hit" leg), then control logic optionally powers down the decode unit (if the decode unit is on) (block 675). Also, micro-op(s) are retrieved from a matching entry in the conventional cache subsystem (block 680), and then the micro-op(s) are conveyed, on a path which bypasses the decode unit, to the processor backend for execution (block 685). After block 685, method 600 ends. It is noted that in one implementation, method 600 is performed for each instruction or instruction group of the instruction sequence.

Figure 7:
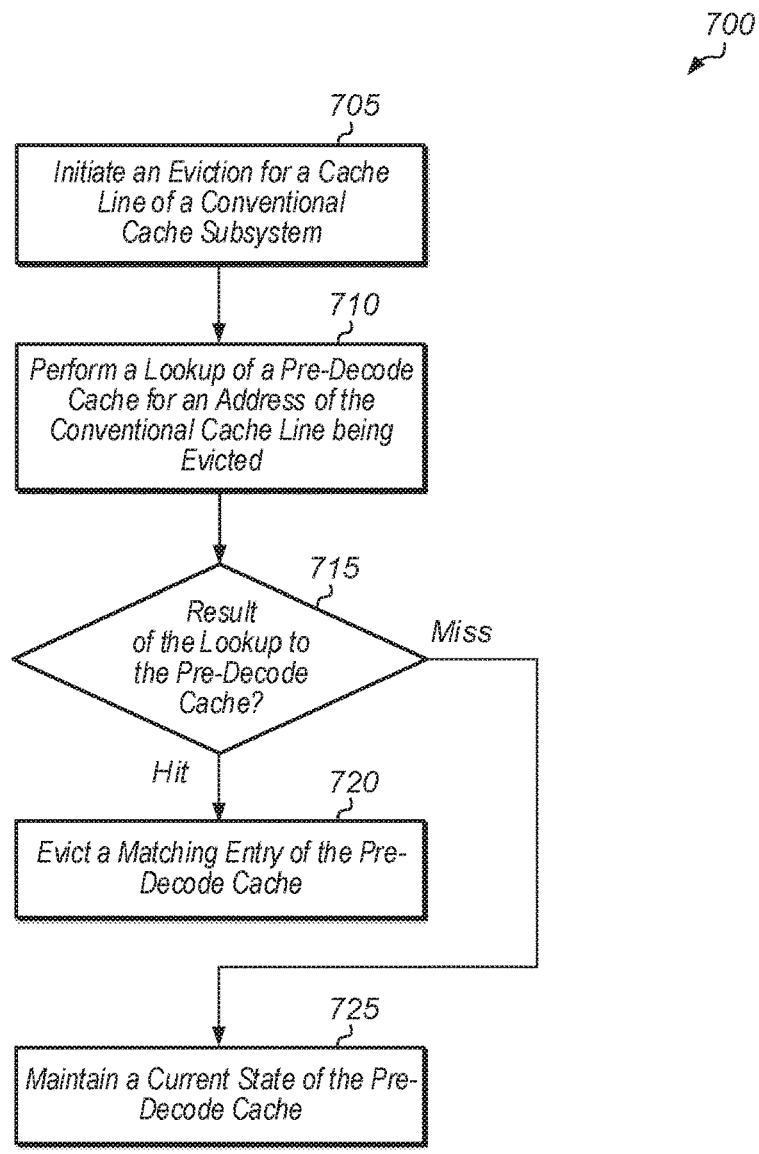
FIG. 7 is a generalized flow diagram illustrating one implementation of a method for processing an eviction from a conventional cache subsystem.

Turning now to FIG. 7, one implementation of a method 700 for processing an eviction from a conventional cache subsystem is shown. An eviction is initiated for a cache line of a conventional cache subsystem (block 705). In response to initiating the eviction from the conventional cache subsystem, control logic performs a lookup of a pre-decode cache for an address of the conventional cache line being evicted (block 710). If the lookup of the pre-decode cache results in a hit (conditional block 715, "hit" leg), then the control logic evicts a matching entry from the pre-decode cache (block 720). Otherwise, if the lookup of the pre-decode cache results in a miss (conditional block 715, "miss" leg), then the control logic maintains a current state of the pre-decode cache (block 725). After blocks 720 and 725, method 700 ends.

Figure 8:
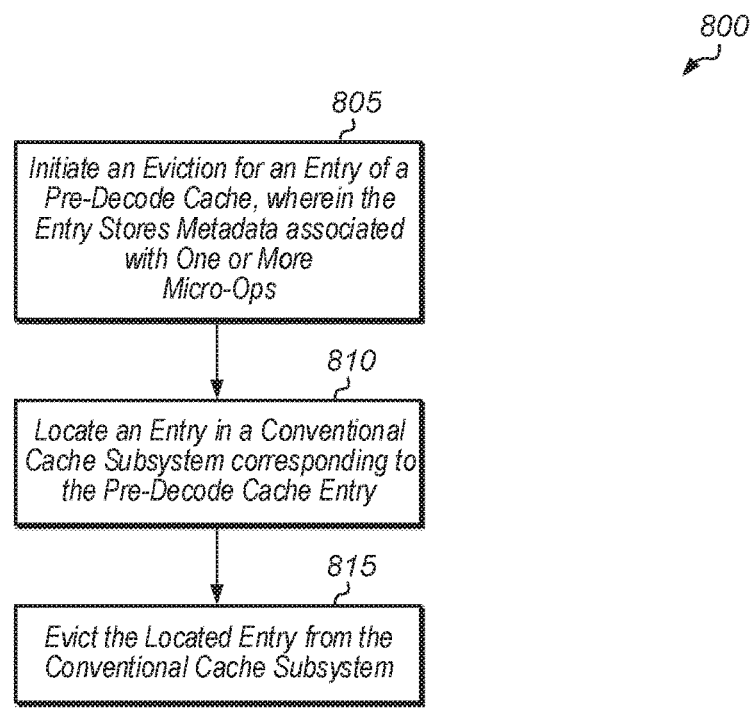
FIG. 8 is a generalized flow diagram illustrating one implementation of a method for processing an eviction from a pre-decode cache.

Referring now to FIG. 8, one implementation of a method 800 for processing an eviction from a pre-decode cache is shown. An eviction is initiated for an entry of a pre-decode cache, wherein the entry stores metadata associated with one or more micro-operations (block 805). In response to initiating the eviction from the pre-decode cache, an entry in a conventional cache subsystem corresponding to the pre-decode cache entry is located (block 810). Next, the located entry in the conventional cache subsystem is evicted (block 815). After block 815, method 800 ends.

Figure 9:
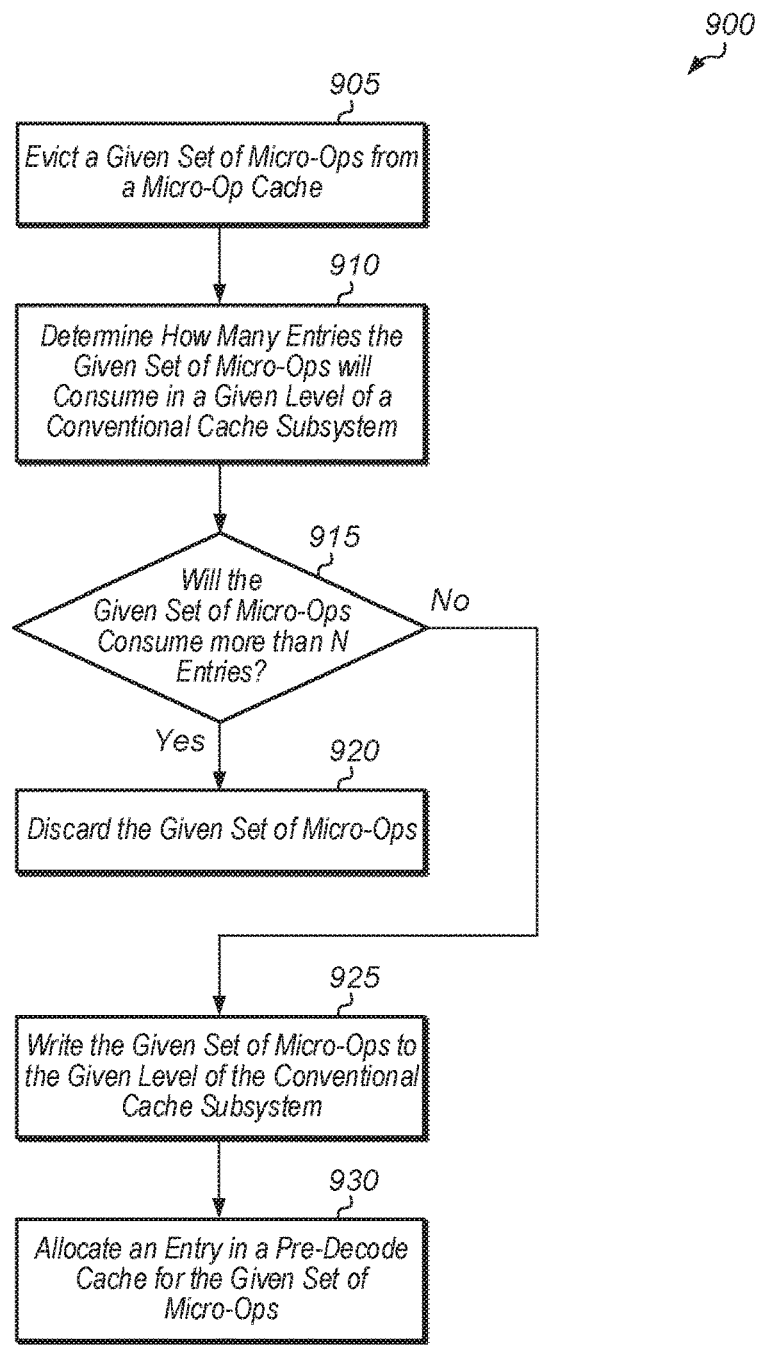
FIG. 9 is a generalized flow diagram illustrating one implementation of a method for determining whether to write a given set of micro-operations evicted from a micro-operation cache to a conventional cache subsystem.

Turning now to FIG. 9, one implementation of a method 900 for determining whether to write a given set of micro-operations evicted from a micro-operation cache to a conventional cache subsystem is shown. A given set of micro-operations are evicted from a micro-operation cache (block 905). In one implementation, the given set of micro-operations are evicted from the micro-operation cache to make room for a newly decoded set of micro-operations. Next, control logic determines how many entries the given set of micro-operations will consume in a given level of a conventional cache subsystem (block 910). In one implementation, the given level is a L1 instruction cache.

If the given set of micro-operations will consume more than N entries of the conventional cache subsystem (conditional block 915, "yes" leg), then the control logic discards the given set of micro-operations rather than writing the given set of micro-operations to the conventional cache subsystem (block 920). In one implementation, N is equal to 2. In other implementations, N is equal to other values, wherein N is a positive integer. If the given set of micro-operations will consume N or fewer entries of the conventional cache subsystem (conditional block 915, "no" leg), then the control logic writes the given set of micro-operations to the conventional cache subsystem (block 925). The control logic also allocates an entry in a pre-decode cache for the given set of micro-operations (block 930). After blocks 925 and 930, method 900 ends.

Figure 10:
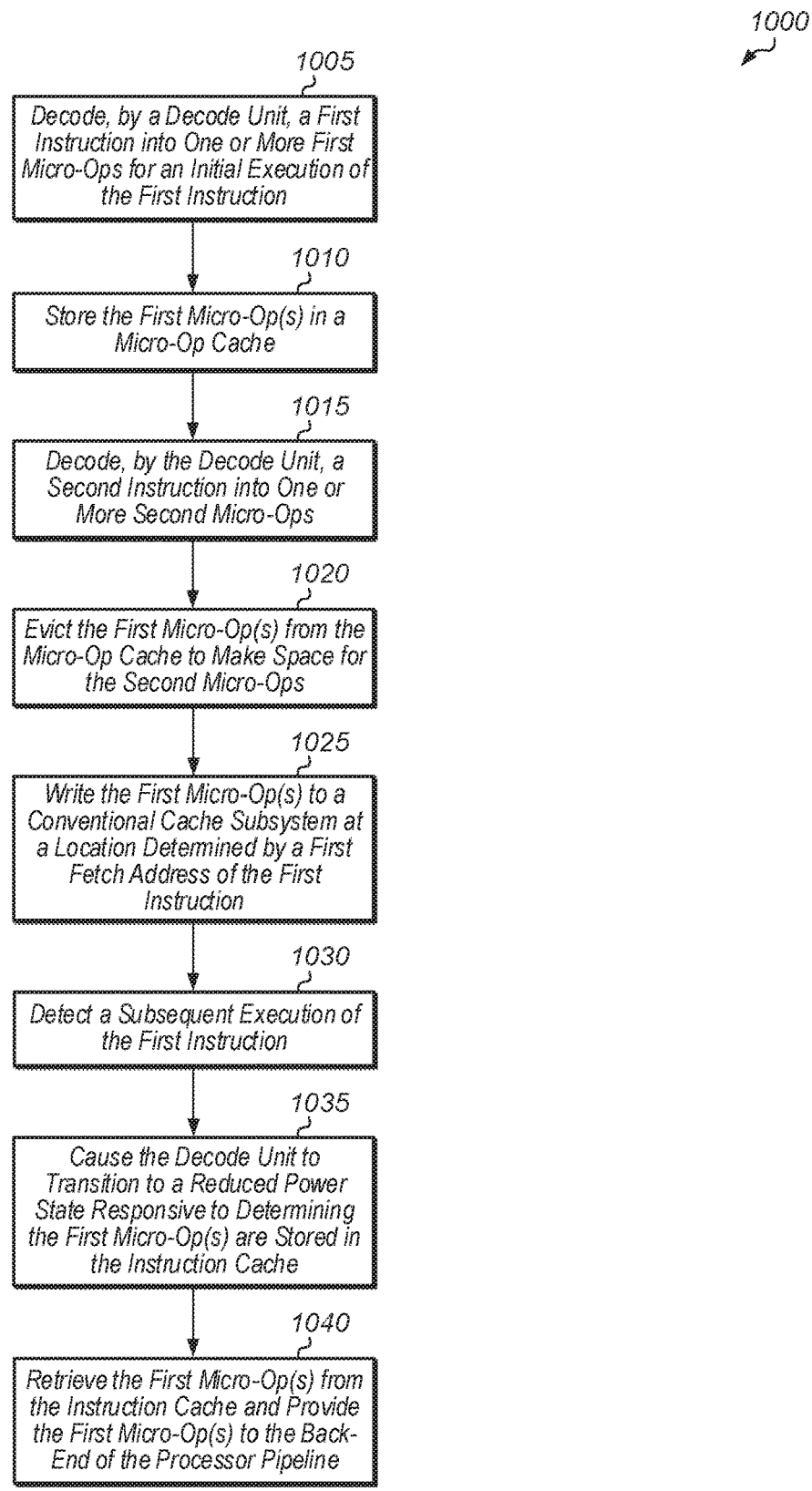
FIG. 10 is a generalized flow diagram illustrating one implementation of a method for virtualizing micro-operations.

Referring now to FIG. 10, one implementation of a method 1000 for virtualizing micro-operations is shown. A decode unit decodes a first instruction into one or more first micro-operations on an initial execution of the first instruction (block 1005). Responsive to decoding the first instruction into one or more first micro-operations, the first micro-op(s) are stored in a micro-operation cache (block 1010). At a later point in time, control logic detects a request to store one or more second micro-operations of a second instruction in the micro-operation cache (block 1015). It is assumed for the purposes of this discussion that in order to make space for the second micro-op(s) in the micro-operation cache, the first micro-operation(s) are evicted from the micro-operation cache (block 1020). Rather than discarding the first micro-op(s) in response to the first micro-op(s) being evicted from the micro-operation cache, control logic writes the first micro-op(s) to a conventional cache subsystem at a location determined by a first fetch address of the first instruction (block 1025). In one implementation, the control logic writes the first micro-op(s) to a L1 instruction cache. In other implementations, the control logic writes the first micro-op(s) to any of various other levels within the conventional cache subsystem hierarchy. In one implementation, the control logic overwrites the first instruction with the first micro-op(s).

At a later point in time, a subsequent execution of the first instruction is detected (block 1030). In response to the subsequent execution of the first instruction being detected, the control logic causes the decode unit to transition to a reduced power state responsive to determining the first micro-op(s) are stored in the instruction cache (block 1035). Also, the control logic retrieves the first micro-op(s) from the conventional cache subsystem and provides the first micro-op(s) to the back-end of the processor pipeline (block 1040). After block 1040, method 1000 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   an instruction cache configured to store a first instruction in a first entry addressable by a first address;
   a fetch unit configured to fetch the first instruction from the instruction cache;
   a decode unit configured to decode the first instruction into one or more first micro-operations; and
   a micro-operation cache configured to store the one or more first micro-operations;
   control logic configured to:
      write the one or more first micro-operations to the instruction cache, responsive to the one or more first micro-operations being evicted from the micro-operation cache; and
      retrieve, via the fetch unit, the one or more first micro-operations instead of the first instruction from the instruction cache, responsive to initiating a fetch, via the fetch unit, of the first instruction.

2. The processor as recited in claim 1, wherein the control logic is further configured to overwrite the first instruction in the first entry of the instruction cache with the one or more first micro-operations responsive to the one or more first micro-operations being evicted from the micro-operation cache.

3. The processor as recited in claim 1, wherein the control logic is further configured to write the one or more first micro-operations evicted from the micro-operation cache to the instruction cache responsive to the one or more first micro-operations meeting a first condition.

4. The processor as recited in claim 3, wherein the first condition is the one or more first micro-operations taking up N or fewer entries in the instruction cache, wherein N is a positive integer.

5. The processor as recited in claim 1, wherein the processor is configured to send the one or more first micro-operations on a path which bypasses the decode unit responsive to determining the one or more first micro-operations are stored in the instruction cache.

6. The processor as recited in claim 1, wherein:
   the processor further comprises a pre-decode cache;
   the control logic is configured to write metadata associated with the one or more first micro-operations to an entry of the pre-decode cache responsive to writing the one or more first micro-operations to the instruction cache; and
   the processor is configured to perform parallel lookups of the instruction cache and the pre-decode cache for a fetched instruction.

7. The processor as recited in claim 1, wherein in response to a determination that the one or more first micro-operations are in the instruction cache, the processor is configured to cause the decode unit to enter a reduced power state.

8. A method comprising:
   storing a first instruction in a first entry of an instruction cache, wherein the first instruction is addressable by a first address;
   fetching, by a fetch unit, the first instruction from the instruction cache;
   decoding, by a decode unit, the first instruction into one or more first micro-operations;
   storing the one or more first micro-operations in a micro-operation cache;
   writing the one or more first micro-operations to the instruction cache responsive to the one or more first micro-operations being evicted from the micro-operation cache;
   retrieving, via the fetch unit, the one or more first micro-operations instead of the first instruction from the instruction cache, responsive to initiating a fetch, via the fetch unit, of the first instruction.

9. The method as recited in claim 8, further comprising overwriting the first instruction in the first entry of the instruction cache with the one or more first micro-operations responsive to the one or more first micro-operations being evicted from the micro-operation cache.

10. The method as recited in claim 8, further comprising writing the one or more first micro-operations evicted from the micro-operation cache to the instruction cache responsive to the one or more first micro-operations meeting a first condition.

11. The method as recited in claim 10, wherein the first condition is the one or more first micro-operations taking up N or fewer entries in the instruction cache, wherein N is a positive integer.

12. The method as recited in claim 8, further comprising sending the one or more first micro-operations on a path which bypasses the decode unit responsive to determining the one or more first micro-operations are stored in the instruction cache.

13. The method as recited in claim 8, further comprising writing metadata associated with the one or more first micro-operations to an entry of a pre-decode cache responsive to writing the one or more first micro-operations to the instruction cache; and performing parallel lookups of the instruction cache and the pre-decode cache for a fetched instruction.

14. The method as recited in claim 13, further comprising causing the decode unit to enter a lower power state than a current power state of the decode unit, responsive to determining the one or more first micro-operations are in the instruction cache.

15. A system comprising:
a memory;
a processor coupled to the memory;
wherein the processor is configured to:
  store a first instruction in a first entry of an instruction cache, wherein the first entry is addressable by a first address;
  fetch, by a fetch unit, the first instruction from the instruction cache;
  decode the first instruction into one or more first micro-operations;
  write the one or more first micro-operations to the instruction cache responsive to the one or more first micro-operations being evicted from a micro-operation cache;
  retrieve, via the fetch unit, the one or more first micro-operations instead of the first instruction from the instruction cache, responsive to initiating a fetch, via the fetch unit, of the first instruction.

16. The system as recited in claim 15, wherein the processor is further configured to overwrite the first instruction in the first entry of the instruction cache with the one or more first micro-operations responsive to the one or more first micro-operations being evicted from the micro-operation cache.

17. The system as recited in claim 15, wherein the processor is further configured to write the one or more first micro-operations evicted from the micro-operation cache to the instruction cache responsive to the one or more first micro-operations meeting a first condition.

18. The system as recited in claim 17, wherein the first condition is the one or more first micro-operations taking up N or fewer entries in the instruction cache, wherein N is a positive integer.

19. The system as recited in claim 15, wherein the processor is further configured to send the one or more first micro-operations on a path which bypasses the decode unit responsive to determining the one or more first micro-operations are stored in the instruction cache.

20. The system as recited in claim 15, wherein the processor is further configured to write metadata associated with the one or more first micro-operations to an entry of a pre-decode cache responsive to writing the one or more first micro-operations to the instruction cache.

* * * * *